(No Model.) 2 Sheets—Sheet 1.

C. D. VERNON.
SCALE AND INDICATOR.

No. 284,692. Patented Sept. 11, 1883.

WITNESSES
Jno. W. Stockett.
W. E. Bowen.

INVENTOR
Chas. D. Vernon
By Myers & Co.
Attorney (No Model.) 2 Sheets—Sheet 2.

C. D. VERNON.
SCALE AND INDICATOR.

No. 284,692. Patented Sept. 11, 1883.

WITNESSES
Jno. H. Hackett,
W. E. Bowen.

INVENTOR
Chas. D. Vernon
By Myers & Co.
Attorney

UNITED STATES PATENT OFFICE.

CHARLES D. VERNON, OF STELLAPOLIS, IOWA.

SCALE AND INDICATOR.

SPECIFICATION forming part of Letters Patent No. 284,692, dated September 11, 1883.

Application filed December 19, 1882. (No model.)

*To all whom it may concern:*

Be it known that I, C. D. VERNON, a citizen of the United States of America, residing at Stellapolis, in the county of Iowa and State of Iowa, have invented certain new and useful Improvements in Scales and Indicators, of which the following is a specification, reference being had therein to the accompanying drawings.

My invention relates to an improvement in scales and indicators for ascertaining and registering by indicating with indexes the quality and purity of all articles, the adulteration of which can be ascertained and indicated by the difference between the weight of the pure and impure, the adulterated and unadulterated, and especially milk and cream and their products, and not only to determine whether they come up to the standard as to purity, but also the extent, if any, of the adulteration thereof; and it consists in the pail A, vertical glass A', scale B, tube B', having float C, vertical hook D, having secured thereto the right-angular spring-hook E, the pivoted bar F, segmental pinion G, spiral spring H, pinion $a$, journal $a'$, indexes $b$ and $b'$, and dials J and J', as hereinafter more fully specified.

Figure 1:
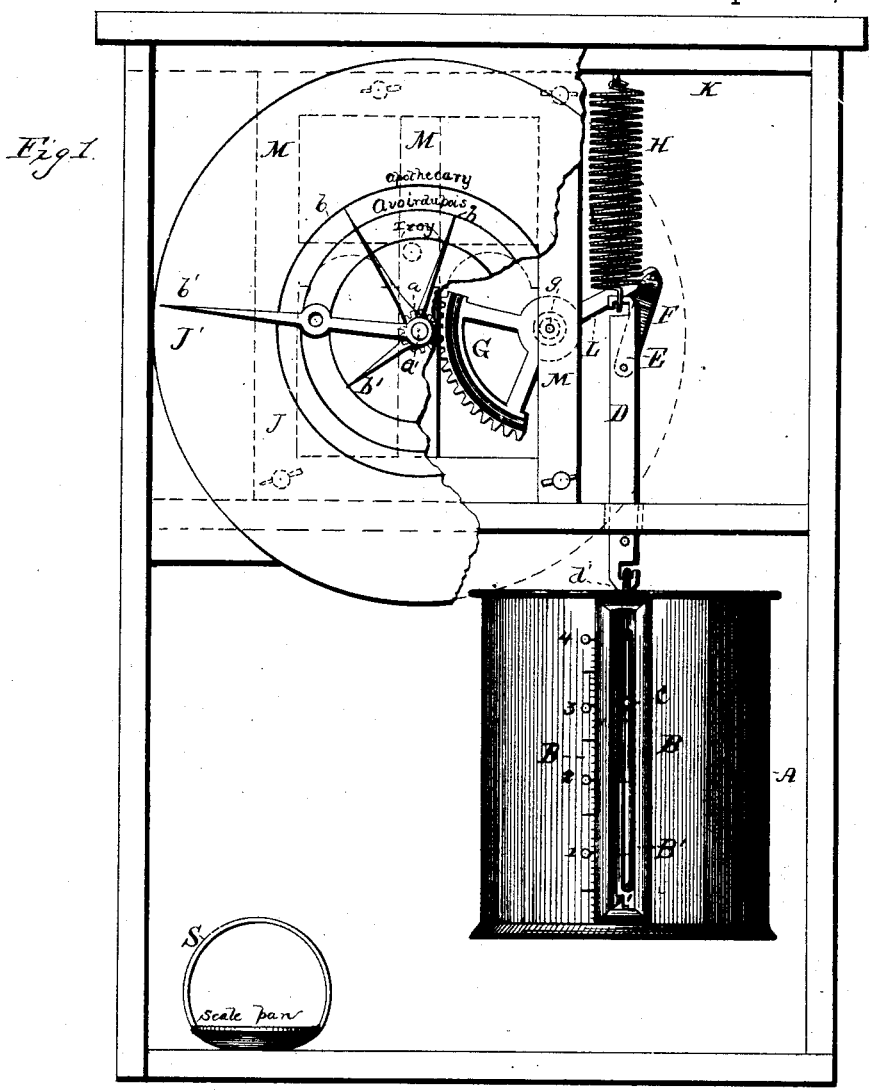
Figure 2:
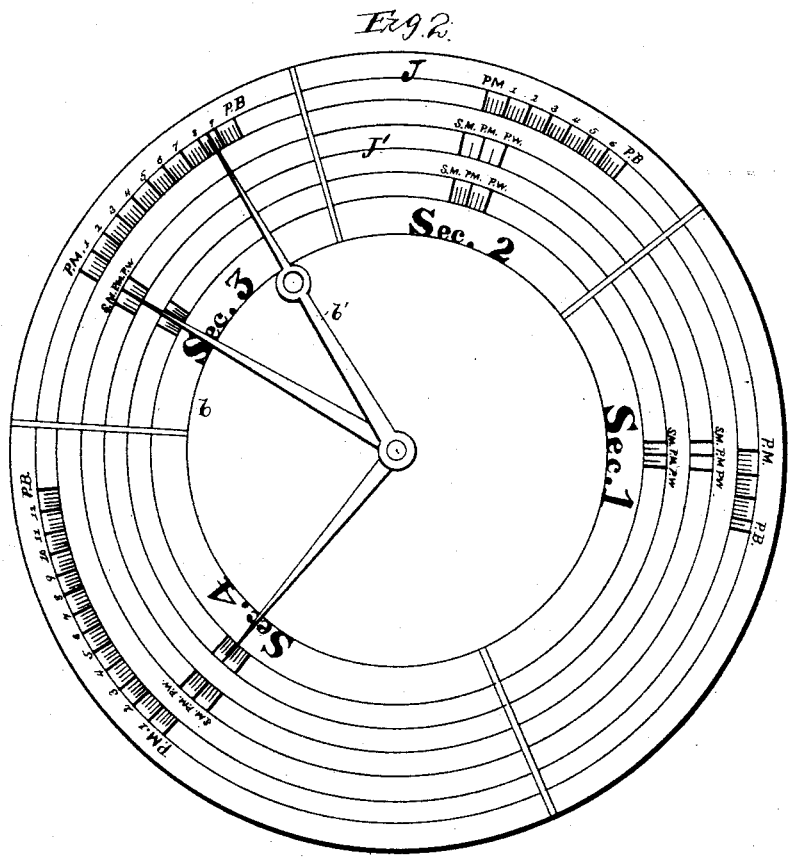
Figure 3:
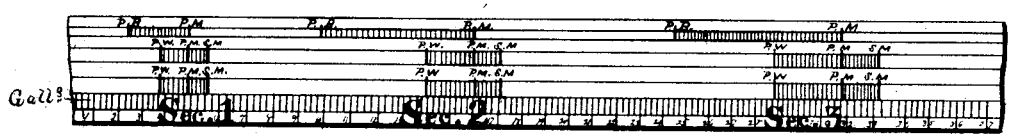

In the drawings, Figure 1 is a front elevation of my invention exclusive of the dials, which are shown in Figs. 2 and 3 as detail views thereof.

A represents a pail having glazed therein a slip of glass, A', through which to inspect the float C in tube B', located inside the pail, the slip of glass being slightly curved to conform to the periphery of the pail, and the pail having carved or painted thereon the scale B. The scale has marked on it quantities from gills to gallons, in order that the altitude of the milk or other fluid in contact or line with the glass A', scale B, and float C may plainly exhibit the quantity thereof contained in the pail; and in order to prevent the eye from being deceived by froth on the milk, the small glass tube B' is adjustably secured against and in a line parallel to the glass A' and scale B. This tube is perforated at top to admit escape of air, and open at bottom to admit the fluid, and as the float is balanced on the fluid, milk-froth fails to deceive the sight as to actual quantity of the milk contained in the pail, as the float is plainly perceptible. The hook D holds the pail-handle $d$ at one end, and is hooked to the lower end of spiral spring H at its other and upper end, and the vertical spiral spring H is secured to the beam K. The pivoted bar F has for its bearings the hook D, to which it is pivoted, its upper end being in like manner secured to arm L of the segmental pinion G.

In testing the quality and degree as to purity of milk in its varying conditions as an article of merchandise, the quantity thereof in gallons or other fluid measure in the pail is first observed as indicated upon the dial-scale, painted or carved on the pail, and secondly upon one of the index-dials, as shown in Fig. 3, which dials are respectively adjusted with precise relation to each specific article indicated thereon. One of the several scale-indexes will then point to skimmed milk, another to cream, &c., and the corresponding indexes will point to the weight thereof. Thus it will be observed (for illustration) that when the pail contains five gallons the dial-indexes point to more or less than five gallons as the article inspected exceeds or falls short of standard purity as determined by estimates the results of which are embodied in dials, as aforesaid. These dials are constructed only after the most careful experiments to determine the precise relation which such articles as milk and cream bear to the adulterations thereof. Each dial comprises two scales of measurement, one scale indicating quantity in gallons and the other scale quantity in pounds. To illustrate, suppose my indicator comprised but two such dials, one of which indicated by weight and measurement "standard as to purity" of milk, and the other dial "standard as to purity" of cream, and that the quantity of the fluid in the pail being indicated on the pail and thus known, its quality is sought to be determined by reference to the scale-dials. Now, if in this supposable case the article sought to be tested is an admixture of milk and cream, we find on consulting the "standard-milk" dial that the article is of weight inferior to that of standard milk, being heavier than cream, and upon reference to the cream-dial it is found that the weight of the article in the pail exceeds that of "standard cream." It is obvious that when these two facts are established by these dials the percentage of the adulteration of the cream may be readily determined by the relation which it bears to milk as indicated by the dials and their indexes. The same means but other dials are also employed to determine the degree of adulteration of milk. Thus the object of my invention is accomplished, which is to produce an indicator which may be employed in hotels, cheese-factories, &c., to prevent fraud.

The segmental pinion G rotates on journal $g$ in the frame M, and its teeth mesh in those of pinion $a'$. Journal $a'$ is rigidly secured to the same horizontal pinion, $a$, as furnishes bearings for the indexes $b$ and $b'$; hence journal $a$ in rotating carries with it both the indexes and the pinion. The several indexes are designed, in connection with the scales, as shown in Figs. 1 and 2, to respectively point to the weight of the articles contained in the pail, one index being for avoirdupois weight, and another for troy or apothecaries' weight, &c. These indexes, a suitable number of which are employed, are arranged with such precise relation to milk and its products, when placed in the pail, that the eight scales of the dial showing qualities of milk and its products and quantities in pounds and gallons, as shown in Fig. 3, are pointed to by the indexes, and thus indicate the different qualities of the article weighed. One dial shows gallons of milk and its products, and also qualities of milk—as skimmed and unskimmed milk—and a corresponding dial shows pounds of milk and its products, thus indicating by relation between weight and quantity in pounds and gallons the quality of the article thus gaged and inspected, the dials thus constructed being carefully made and proved by repeated experiments.

In the construction of my scales and indicator I first ascertain the standard weight of pure and unadulterated articles to be tested—such as pure milk, cream, and other products of these articles—and then adjust the indexes, as in ordinary scales, to point to the scale-dial (see Figs. 2 and 3) in such manner with relation to specific quantities contained in the pail that the indexes point to and the scale-dial indicates a constant and uniform relation of the pure to the impure and the adulterated to the unadulterated. Thus constructed, in testing milk, the person consulting the indicator need but note the quantity of fluid in the pail and the point to which the index points on the scale-dial, the scale-dial being so arranged and lettered as to plainly show whether the contents of the pail are milk, cream, or adulterated mixtures of those articles with water or each other. In ascertaining the weight of other articles, whether to test their purity or otherwise, if they are unsuitable to be placed in the milk-pail, I employ the scale-pan S.

What I claim, and desire to secure by Letters Patent, is—

In an indicator, the combination of a weighing-receptacle, A, having dial-scale, tube, and float to indicate quantity of contents in gallons, and double hook-arm D, pivotal bar F, spring H, segmental pinion G, pinion $a$, indexes $b\ b'$, and dials $j\ j'$, with divisions indicating relative weight and measure of articles weighed, all arranged as herein described, whereby the adulteration of the articles weighed may be detected.

In testimony whereof I affix my signature in presence of two witnesses.

CHARLES D. VERNON.

Witnesses:
GEO. SWAIN,
J. C. DINWIDDIE.